United States Patent [19]
Micali

[11] Patent Number: 6,026,163
[45] Date of Patent: Feb. 15, 2000

[54] DISTRIBUTED SPLIT-KEY CRYPTOSYSTEM AND APPLICATIONS

[76] Inventor: Silvio Micali, 459 Chestnut Hill Ave., Brookline, Mass. 02146

[21] Appl. No.: 08/766,448

[22] Filed: Dec. 12, 1996

Related U.S. Application Data

[60] Provisional application No. 60/008,555, Dec. 13, 1995.

[51] Int. Cl.$^7$ ........................................................ H04K 1/00
[52] U.S. Cl. ............................ 380/9; 380/30; 380/21; 380/47; 705/64; 705/71; 705/74; 705/75; 705/77; 705/78; 705/80
[58] Field of Search ........................... 380/4, 21, 25, 380/28, 29, 30, 43, 44, 45, 46, 49, 59; 705/1, 37, 74, 77, 78, 80; 713/168, 171

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,326,098 | 4/1982 | Bouricius et al. . |
| 4,375,579 | 3/1983 | Davida et al. . |
| 4,405,829 | 9/1983 | Rivest et al. . |
| 4,438,824 | 3/1984 | Mueller-Schloer . |
| 4,458,109 | 7/1984 | Mueller-Schloer . |
| 4,879,747 | 11/1989 | Leighton et al. . |
| 4,885,777 | 12/1989 | Takaragi et al. . |
| 4,908,861 | 3/1990 | Brachtl et al. . |
| 4,924,514 | 5/1990 | Matyas et al. . |
| 4,933,970 | 6/1990 | Shamir . |
| 4,944,009 | 7/1990 | Micali et al. . |
| 4,953,209 | 8/1990 | Ryder, Sr. et al. . |
| 4,995,081 | 2/1991 | Leighton et al. . |
| 5,005,200 | 4/1991 | Fischer . |
| 5,018,196 | 5/1991 | Takaragi et al. . |
| 5,081,676 | 1/1992 | Chou et al. . |
| 5,124,117 | 6/1992 | Tatebayashi et al. ..................... 380/30 |
| 5,136,643 | 8/1992 | Fischer . |
| 5,150,411 | 9/1992 | Maurer . |
| 5,177,791 | 1/1993 | Yeh et al. . |
| 5,199,070 | 3/1993 | Matsuzaki et al. . |
| 5,202,977 | 4/1993 | Pasetes, Jr. et al. . |
| 5,208,853 | 5/1993 | Armbruster et al. . |
| 5,214,698 | 5/1993 | Smith, Sr. et al. . |
| 5,214,700 | 5/1993 | Pinkas et al. . |
| 5,220,501 | 6/1993 | Lawlor et al. . |
| 5,224,162 | 6/1993 | Okamoto et al. . |
| 5,276,737 | 1/1994 | Micali . |
| 5,315,658 | 5/1994 | Micali ..................................... 380/30 |
| 5,373,558 | 12/1994 | Chaum . |
| 5,440,634 | 8/1995 | Jones et al. . |
| 5,453,601 | 9/1995 | Rosen . |
| 5,455,407 | 10/1995 | Rosen . |
| 5,497,421 | 3/1996 | Kaufman et al. . |
| 5,509,071 | 4/1996 | Petrie, Jr. et al. . |
| 5,511,121 | 4/1996 | Yacobi . |
| 5,521,980 | 5/1996 | Brands . |
| 5,553,145 | 9/1996 | Micali . |
| 5,557,346 | 9/1996 | Lipner et al. ............................ 380/21 |
| 5,610,982 | 3/1997 | Micali . |
| 5,615,269 | 3/1997 | Micali . |
| 5,633,928 | 5/1997 | Lenstra et al. .......................... 380/21 |
| 5,664,017 | 9/1997 | Gressel et al. .......................... 380/30 |
| 5,666,414 | 9/1997 | Micali ..................................... 380/21 |
| 5,666,420 | 9/1997 | Micali ..................................... 380/30 |
| 5,675,649 | 10/1997 | Brennan et al. ......................... 380/21 |
| 5,761,306 | 1/1998 | Lewis ....................................... 380/21 |
| 5,794,207 | 8/1998 | Walker ..................................... 705/23 |
| 5,796,830 | 8/1998 | Johnson et al. ......................... 380/21 |
| 5,799,086 | 8/1998 | Sudia ....................................... 380/23 |
| 5,809,144 | 9/1998 | Sirbu ........................................ 380/25 |
| 5,812,670 | 9/1998 | Micali ..................................... 380/25 |
| 5,815,573 | 9/1998 | Johnson et al. ......................... 380/21 |
| 5,841,865 | 11/1998 | Sudia ....................................... 380/21 |
| 5,850,442 | 12/1998 | Muftic ..................................... 380/21 |
| 5,850,451 | 12/1998 | Sudia ....................................... 380/49 |
| 5,857,022 | 1/1999 | Sudia ....................................... 380/23 |
| 5,872,849 | 2/1999 | Sudia ....................................... 380/49 |

OTHER PUBLICATIONS

Needham et al "Using Encryption for Authentication in Large Networks of Computers", *Communications of the ACM*, vol. 21, No. 12, Dec. 1978, pp. 993–999.

Chor et al., "Verifiable Secret Sharing and Achieving Simultaneity in the Presence of Faults", Extended Abstract, *IEEE*, 1985, pp. 383–395.

Even, S., "Secure Off–Line Electronic Fund Transfer Between Nontrusting Parties", Abstract, Jan. 31, 1988, 10 pps.

Shamir, A., "How to Share a Secret", *Communications of the ACM*, vol. 22, No. 11, Nov. 1979, pp. 612–613.

Chaum, D., "Untraceable Electronic Mail, Return Addresses, and Digital Pseudonyms", *Communications of the ACM*, vol. 24, No. 2, Feb. 1981, pp. 84–88.

Desmedt, et al., "Threshold Cryptosystems", *EE & CS Department, University of Wisconsin–Milwaukee*.

Rabin, M., "How to Exchange Secrets", May 20, 1981, pp. 1–21.

Kolata, G., Cryptographers Gather to Discuss Research—Analyses of how to break codes and new ways to use codes were featured at the meeting, *Science*, vol. 214, No. 6, 1981, pp. 646–647.

Blum, M., "How to Exchange (Secret) Keys", *ACM Transactions on Computer Systems*, vol. 1, No. 2, May 1983, pp. 175–193.

Luby, et al., "How to Simultaneously Exchange a Secret Bit by Flipping a Symmetrically–Biased Coin", *IEEE*, 1983, pp. 11–21.

Even et al., "A Randomized Protocol for Signing Contracts", *Communications of the ACM*, vol. 28, No. 6, Jun. 1985, pp. 637–647.

(List continued on next page.)

*Primary Examiner*—Tod R. Swann
*Assistant Examiner*—Paul E. Callahan
*Attorney, Agent, or Firm*—Foley, Hoag & Eliot LLP

[57] ABSTRACT

A distributed split-key cryptosystem and application in a public-key setting wherein each of a plurality of trustees independently selects his own secret-public key pair. The trustees combine their public encryption keys into a single public encryption key. Using this combined public key for an electronic auction and other secure transactions.

4 Claims, 1 Drawing Sheet

OTHER PUBLICATIONS

Goldreich et al., "How to Play Any Mental Game or a Completeness Theorem for Protocols with Honest Majority", *Proceedings of the 27th Annual IEEE ACM Symposium on Theory of computing*, May 1987, pp. 218–229.

Goldwasser et al., "The Knowledge complexity of Interactive Proof Systems", *Siam Journal of Computing*, vol. 18, No. 1, Feb. 1989, pp. 186–208.

Damgard, I., "Payment Systems and Credential Mechanisms with Provable Security Against Abuse by Individuals", Extended Abstract, pp. 328–335, Proceedings of Crypto '88.

Chaum et al., "Untraceable Electronic Cash", Extended Abstract, pp. 319–327, Proceedings of Crypto '88.

Dolev et al., "Non-Malleable Cryptography", Extended Abstract, *Communications of the ACM*, Mar. 1991, pp. 542–552.

Batelaan et al., "Internet Billing Service Design and Protype implementation", Carnegie Mellon University Information Networking Institute 1992 Final Project, Mar. 30, 1993, 16 pps.

Burk et al., "Digital Payment Systems Enabling Security and Unobservability", *Computers & Security*, vol. 8, 1989, pp. 399–415.

Rabin, M., "Transaction Protection by Beacons", Harvard University, Cambridge, MA, Nov. 1981, 21 pps.

Ben–Or et al., "A Fair Protocol for Signing Contracts", *IEEE Transactions On Information Theory*, vol. 36, No. 1, Jan. 1990, pp. 40–46.

Rivest, et al., "A Method for Obtaining Digital Signatures and Public–Key Cryptosystems," *Communications of the ACM*, Feb. 1978, pp. 120–126.

Goldreich et al., "Proofs That Yield Nothing But Their Validity or All Languages in NP Have Zero–Knowledge Proof Systems", *Journal of the Association for Computing Machinery*, vol. 38, No. 1, Jul. 1991, pp. 691–729.

Leighton, Tom; & Micali, S., "New Approaches to Secret–Key Exchange", Apr. 1993.

Leighton, Tom; & Kilian, Joseph, "Failsafe Key Escrow", Aug. 1994.

Rabin, Tal; & Ben–Or, Michael; "Verifiable Secret Sharing and Multiparty Protocols with Honest Majority" (Extended Abstract), Institute of Mathematics and Computer Science, The Hebrew University, Jerusalem, Irasel, Aug. 1989, pp. 73–85.

Karnin, Ehud D.; Greene, Jonathan W.; & Hellman, Martin E., "On Secret Sharing Systems", IEEE Transactions on Information Theory, vol. IT–29, No. 1, Jan. 1983.

Meyer, Carl H. & Matyas, Stephen M., "Cryptography: a New Dimension in Computer Data Security", Cryptography Competency Center, IBM Corporation, Kingston, New York, 1982 pp. 350–541.

Micali, S., "Fair Cryptosystems", MIT/LCS/TR–579.b, Nov. 1993.

B. Schneier; Applied Cryptography, Second Edition; May 22, 1995; John Wiley & Son, Inc.

Yao, Andrew C., "Protocols for Secure Computations" (Extended Abstract) 1982, University of California, Berkeley, CA., pp. 160–169.

Micali, Silvio and Philip Rogaway, "Secure Computation" (Abstract) Undated.

Ben–Or, Michael, Shafi Goldwasser and Avi Wigderson, "Completeness Theorms for Non–Cryptographic Fault–Tolerant Distributed Computation" (Extended Abstract) ACM, 1988, pp. 1–10.

Longley, Dennis and Shain, Michael; "Data & Computer Security: Dictionary of standards concepts and terms", 1987, pp. 10–421.

Chor, Benny, Shafi Goldwasser, Silvio Micali and Baruch Awerbauch, "Verifiable Secret Sharing and Achieving Simultaneity in the Presence of Faults" (Extended Abstract), Massachusetts Institute of Technology Laboratory for Computer Science, 1985, pp. 383–395.

Graham, S.L. adn R.L. Rivest, "A Method for Obtaining Digital Signatures and Public–Key cryptosystems" Communications of the ACM, Feb. 1978, vol. 21, No. 2.

Micali, S., "Fair Public–Key Cryptosystems", Cryptosystems, May 20, 1992.

Pederson, Torben Pryds, "Distributed Provers with Applications to Undeniable Signatures", Eurocrypt '91 Abstracts, Univ. Of Sussex, Brighton, UK, 8th–11th Apr. 1991, pp. 117–122.

Beth, Th., "Zur Diskission gestellt, Informatic Spektrum", vol. 13, 1990, pp. 204–215.

Feldman, Paul, "A Practical Scheme for Noninteractive Verifiable Secret Sharing", 1987, pp. 427–437.

Blakley, G.R., "Safeguarding Cryptographic Keys, AFIPS–Conference Proceedings", vol. 48, National Computer Conference, 1979, pp. 313–317.

DeMillo, Richard A., Davida, George I., Dobkin, David P.; Harrison, Michael A.; and Lipton, Richard J., "Cryptology in Revolution: Mathematics and Models", San Francisco, CA, Jan. 5–6, 1981, pp. 152–155.

Simmons, Gustavus J., "How to (Really) Share a Secret", Advances in Cryptology—Crypto '88, pp. 390–448.

Benaloh, Josh Cohen, "Secret Sharing Homomorphisms: Keeping Shares of A Secret Secret", Advances in Cryptology–Crypto '86, pp. 251–260.

Galil, Zvi; & Yung, Moti, "Partitioned Encryption & Achieving Simultaneity by Partitioning", Oct. 19, '87, pp. 81–88.

Feldman, Paul Neil, "Optimal Algorithms for Byzantine Agreement", May 13, 1988.

Diffie, Whitfield; & Hellman, Martin E., "New Directions in Crytography", IEEE Transactions on Information Theory, vol. IT–22, No. 6, Nov. 1976, pp. 644–654.

Chaum, David, Claude Crepeau and Ivan Damgdrd, "Multiparty Unconditionally Secure Protocols"(Extended Abstract) ACM, 1988, pp. 11–19.

G. simmons, "How to Insure that Data Acquired to Verify Treaty Compliance are Trustworthy", Proceedings IEEE, vol. 76 No. 5, May 1988.

Merkle, Ralph C., "A Digital Signature Based on a Conventional Encryption Function", 1987.

Brassard, et al. "Mimimum Disclosure Proofs of Knowledge", Journal of Computer and System Sciences 37, pp. 156–189, 1988.

Beker, Henry; & Piper, Fred, Cipher Systems, 1982, pp. 292–305 (Sections 8.2 and 8.3).

Konheim, Alan G., Cryptography—A Primer, 1981, pp. 285–293 (Chapter).

Denning D.E.R., Cryptograph & Data Security, 1982, pp. 161–179 (Sections 3.6 and 3.7).

Simmons, Gustvus J., Contemporary Cryptology The Science of Information Integrity, 1992, pp. 325–419 and 615–630 (Chapters 6, 7 and 13).

Micali, S., "Fair Public Key Cryptosystems", Advances in Cryptology—Crypto '92, Aug. 1992.

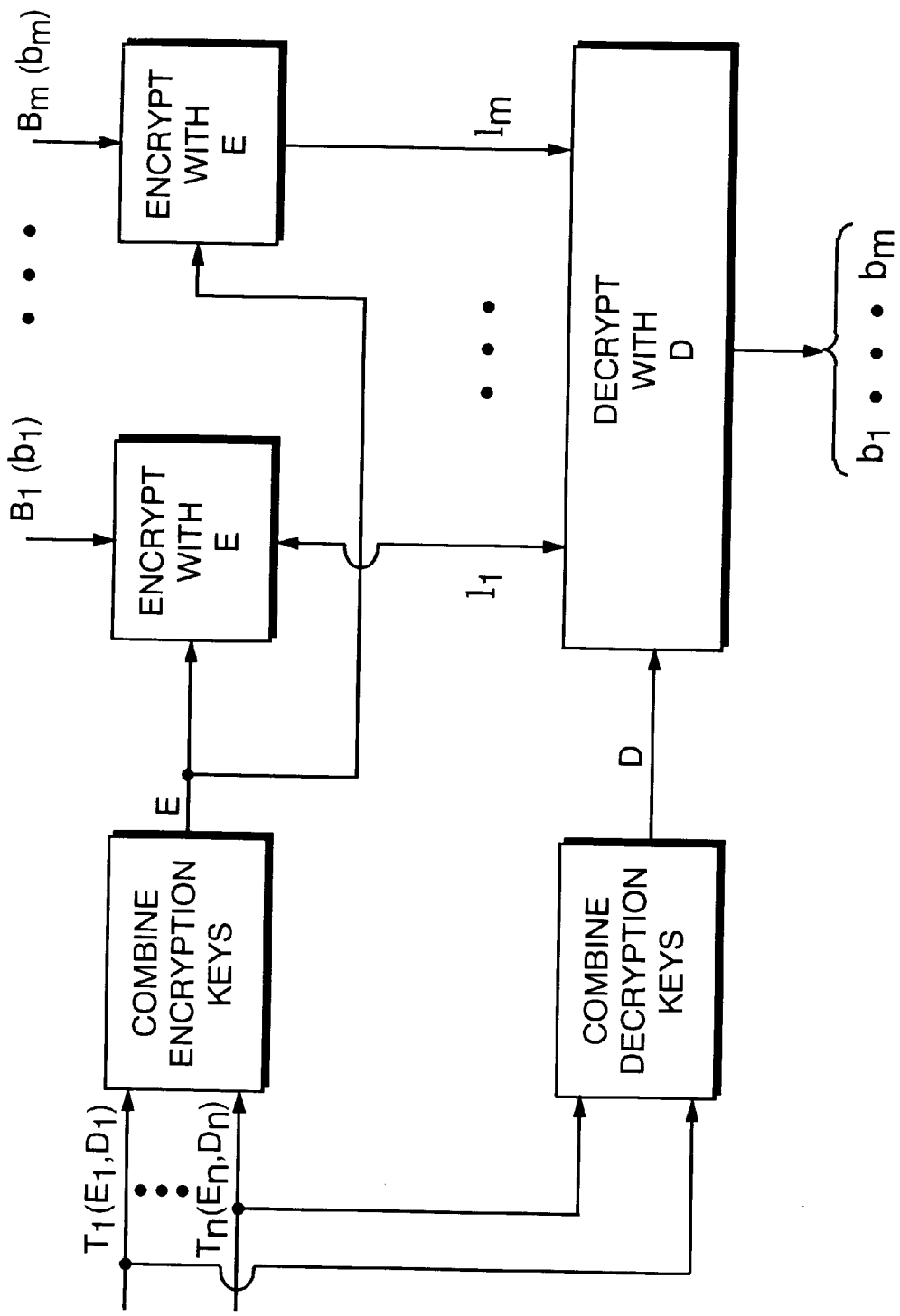

DISTRIBUTED SPLIT-KEY CRYPTOSYSTEM AND APPLICATIONS

This application is based on United States provisional patent application number 60/008,555, filed Dec. 13, 1995.

TECHNICAL FIELD

The present invention relates to secure communications.

BACKGROUND OF THE INVENTION

Recently, systems have been developed by which a secret decryption key is in the hands of several trustees, so that each trustee holds a guaranteed piece of the key, while he cannot predict the full key. Examples of such systems include Micali's Fair Cryptosystems and the Clipper Chip.

We want to develop such a system in a public key setting so that the secret key that is guaranteed to be shared among some trustees is the secret decryption key corresponding to a given public encryption key. The inventive system does not work by having an initial entity who (1) computes a public-secret key pair, and (2) divides the secret key among various trustees in a proper way. Indeed, whether or not such entity blows itself up after doing so (e.g., as suggested by Desmet), the doubt exists that leakage of the secret decryption key may have occurred, either maliciously or by accident.

SUMMARY OF THE INVENTION

Accordingly, the present invention works by having each trustee independently select his own secret-public key pair, and then having the trustees combine their public encryption keys into a single public encryption key. To this combined public key corresponds a combined secret key, such that the individual secret keys selected by the trustees are guaranteed to be pieces of this combined secret key. Thus, while no one knows said combined secret key (and indeed while, possibly, this secret key has never been computed, if so wanted), the trustees are guaranteed that they can reconstruct this key, or, alternatively, that they can decrypt any message encrypted with the combined public key without revealing its corresponding secret key.

BRIEF DESCRIPTION OF DRAWINGS

The sole FIGURE illustrates a bid and auction process according to the present invention.

DETAILED DESCRIPTION OF THE PREFERRED EMBODIMENT

Let us exemplify one way to achieve our goals with the Diffie-Hellman public-key cryptosystem. The skilled in the art will have no difficulty in obtaining similar results for other public-key cryptosystems.

In the Diffie-Hellman system, there is a prime p and a generator g common to all users. A user X chooses his own secret key x at random between 1 and p−1, and sets his public key to be $g^x$ mod p. Let now y and $g^y$ mod p be, respectively, the secret and public keys of user Y. Then X and Y essentially share the secret key $g^{xy}$ mod p. Indeed, each of X and Y can compute this "common secret key" by raising the other's public key to his own secret key mod p.

On the other hand, without knowledge of x or y, no other user can, given the public keys $g^x$ mod p and $g^y$ mod p, based on any known method, feasibly compute the secret key $g^{xy}$ mod p. Thus X or Y can use this key to secure communications between each other (e.g., by using it as the key of a symmetric cipher).

Let now $T_1, \ldots, T_n$ be our trustees. Then, each $T_i$ chooses a secret key $x_i$ and a matching public key $g^{x_i}$ mod p. Then the combined public key is set to be the product of these public keys mod p, $g^z$ mod p (i.e., $g^z = g^{x_1 + \cdots + x_n}$ mod p). This key can be made public or otherwise known to a group of users. Alternatively, the individual trustees' public keys can be made known, so that anyone can compute the combined public key from the individual trustees' public keys, just as the trustees themselves did.

Notice that each trustee has a share of the corresponding secret key, z, of the combined secret key so computed. Indeed, this combined secret key would be $z = x_1 + \cdots x_n$ mod p−1. Thus each trustee is guaranteed to have a piece of this combined key. Indeed, if the trustees want, they could reveal their secret keys and thus easily compute z. Notice that a trustee cannot reveal a false piece of z without being caught. For instance, if trustee $T_1$ reveals a piece $p_1$ other than $x_1$, anyone can detect that $g^{p_1} \neq g^{x_1} T_1$'s public key.

Assume now that user Alice wishes to encrypt a message m with the combined public key. Then she selects a (preferably) temporary secret key a and its corresponding public key $g^a$ mod p; computes the secret key $g^{az}$ mod p; encrypts m conventionally with said key $g^{az}$; and sends this ciphertext to a proper recipient together with the temporary public-key $g^a$ mod p.

At this point, the encryption of Alice's message is known, while the message can be revealed by either Alice herself (e.g., by releasing a), or by the collection of Trustees; for instance, by having them release their individual secret keys $x_i$, and thus the combined secret key z.

This method can be used for applications other than law-enforcement ones. For instance, it can be used for simultaneous (sealed-bid) electronic auctions, which is illustrated in the sole Figure, which shows bidders $B_1 \ldots B_m$ submitting sealed bids $b_1 \ldots b_m$ in a system having n trustees, $T_1 \ldots T_n$. Indeed, users, like Alice, may encrypt their bids with a proper combined key (preferably indicating within the secret bid their own identities in order, among other things, to avoid that their bids can be "copied" by others). At the appropriate time, all bids will be revealed; for instance, by having the trustees release their individual $x_i$, values so that the combined secret key z can be reconstructed, and thus all secret keys $g^{az}$ mod p are also reconstructed and used for decrypting all bids.

Notice that no one can leak an individual bid, before the proper time, without the consent of the user who made it. In fact, for decrypting a bid the cooperation of all trustees would be needed, and it is extremely unlikely that such an improper collusion will ever occur if the Trustees are chosen to be trustworthy (or properly functioning machines). Thus, each individual bidder is protected, and so are the trustees (e.g., from some frivolous accusation of bid leakage).

It should be appreciated that such an auction mechanism is just one application of the inventive technology. The system can also be implemented so that certain prescribed sets of trustees (e.g., any majority of trustees rather than all trustees) suffice for reconstructing the combined secret key. Also, decryption of user messages may occur without revealing the combined secret key, if so wanted.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for an electronic auction with encrypted bids, comprising:

having each of a plurality of trustees generate an individual public key with a corresponding individual secret key;

combining the individual public keys of the plurality of trustees into a combined public key;

encrypting a bid of a user with the combined public key;

reconstructing a combined secret key corresponding to the combined public key from the individual secret keys of the plurality of trustees; and using the combined secret key to decrypt the user's bid.

2. A method according to claim 1, wherein the bid of a user is encrypted together with an indication of an identity of the user.

3. A method according to claim 1, wherein the bid of the user includes an indication of an identity of the user.

4. A method as in claim 1, wherein the bid of the user in encrypted so as to avoid that the bid of the user is copied by another user.

* * * * *